J. MACPHAIL.
RAKE TOOTH.
APPLICATION FILED SEPT. 22, 1913.
1,147,741.
Patented July 27, 1915.
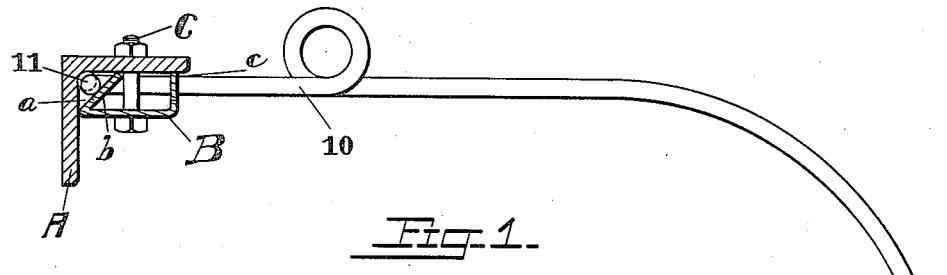
Fig. 1.
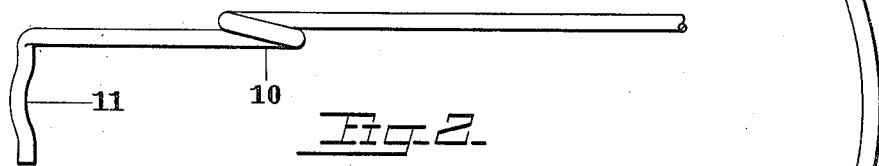
Fig. 2.
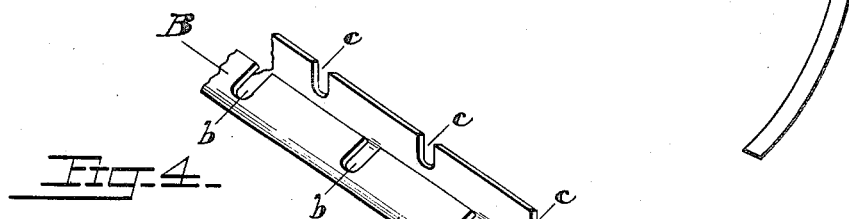
Fig. 4.
Fig. 3.
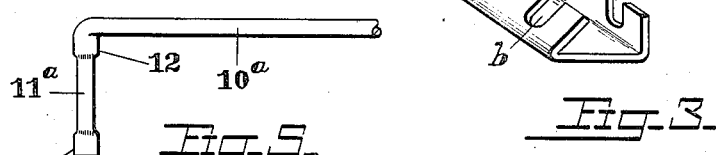
Fig. 5.
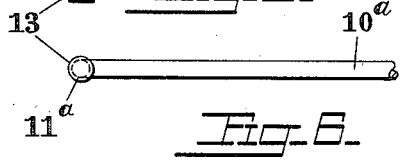
Fig. 6.
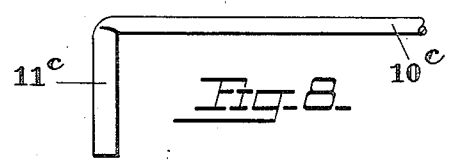
Fig. 8.
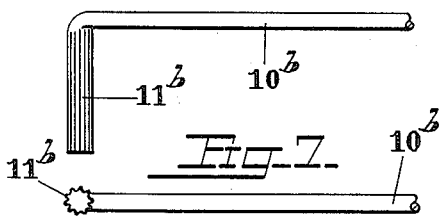
Fig. 7.
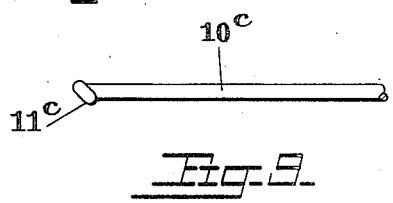
Fig. 9.
Witnesses:
Rophene Freeman
W. A. Furner.
Inventor:
James Macphail,
By Adams & Jackson,
Attorneys.

UNITED STATES PATENT OFFICE.

JAMES MACPHAIL, OF DAVENPORT, IOWA, ASSIGNOR, BY MESNE ASSIGNMENTS, TO DEERE & COMPANY, OF MOLINE, ILLINOIS, A CORPORATION OF ILLINOIS.

RAKE-TOOTH.

1,147,741.  Specification of Letters Patent.  Patented July 27, 1915.

Application filed September 22, 1913. Serial No. 791,075.

*To all whom it may concern:*

Be it known that I, JAMES MACPHAIL, a citizen of the United States, residing at Davenport, in the county of Scott, in the State of Iowa, have invented certain new and useful Improvements in Rake-Teeth, of which the following is a specification, reference being had to the accompanying drawing.

It is customary to make the teeth for sulky hay-rakes of wire of different diameters to suit different requirements. Such teeth are customarily made of the following diameters, 25/64, 13/32, 7/16 and 1/2 inch, and to accommodate these various sizes of teeth it has been necessary to provide corresponding sizes of tooth-holders in order that the turned upper ends or "laterals" of the teeth may fit snugly in the space provided for them. This necessitates dealers carrying a large supply of extra tooth-holders, and frequently delays and serious inconvenience are caused a user by reason of being furnished with holders that are not of the right size to properly hold the teeth of his rake.

The object of my invention is to so construct the rake-teeth laterals that they will properly fit and be held by any standard tooth holder regardless of the diameter of the wire from which the teeth are formed. Briefly stated I accomplish this object by so distorting the lateral of each tooth that is formed of a wire less than the largest size, that it will, for clamping purposes, fit within the chamber or socket formed by the walls of the rake head and the tooth holder that is bolted to such head,—it being understood that the laterals of those teeth formed from the largest diameter of wire will fit such socket without being distorted or changed in shape. As shown in the drawings and hereinafter described the distorting of the laterals of the smaller diameter may be accomplished in various ways.

In the drawings, Figure 1 is a vertical section through an angle-iron rake-head with a tooth holder bolted thereto and showing one of my improved rake-teeth clamped in place by the holder; Fig. 2 is a plan view of a portion of a rake-tooth in which is embodied my improvement; Fig. 3 is a perspective view of the tooth-holder shown in Fig. 1; Figs. 4 and 5 are plan and side views, respectively, of a rake tooth having a modified construction of lateral; Figs. 6 and 7 are similar views illustrating a second modification in the construction of the lateral; and Figs. 8 and 9 are similar views illustrating a third modification.

Referring to the several figures of the drawings in which corresponding parts are indicated by like reference characters,—A indicates a rake-head formed of angle-iron.

B indicates a tooth-holder formed of a piece of channel-iron having the edges of its flanges bearing against the inner face of one wall of the head A, one of such flanges being turned at an angle to provide a triangular chamber *a* between it and the walls of said head A.

C indicates one of several bolts employed for securing the holder to the head. The holder illustrated forms no part of my present invention but is the subject matter of a pending application filed by me July 9, 1913, Serial No. 778,018. While the said holder is well adapted for use in connection with my present improvements it is to be understood that my improved rake-teeth are adapted to be used with any suitable holder which by itself or in association with another member, as a rake-head like A for example, provides a proper chamber for the reception of the laterals of the teeth. The holder B has its flanges provided with slots through which pass the bodies or main portions of the rake-teeth, the slots in the inclined flange being indicated by *b*, and those in the other flange by *c*.

The rake-tooth in each instance is to be formed of heavy wire, as stated, and referring now particularly to the construction shown in Figs. 1 and 2, 10 indicates the main or body portion of a tooth and 11 the turned upper end or "lateral." Ordinarily such lateral is formed by simply bending the wire at a right angle and with respect to the largest size of teeth that is the way I contemplate making them, and the holders that clamp the teeth to the rake-head are to be so constructed that the chamber *a* will properly receive them and securely hold them. It is evident, however, that the laterals of rake-teeth formed of smaller wire cannot fit properly in the same size chamber that receives the said largest size, and, indeed, when the laterals are formed by simply bending the wire as stated, there arises the necessity for providing a different holder for each size of tooth so that each size of tooth may have for the laterals the proper sized chamber. To avoid this I give to each tooth lateral, in the case of all teeth of less size than the largest, a bend or bulge between its ends, as clearly shown in Fig. 2, which bend or bulge will bear against one side of the chamber while the straight end portions will bear against the opposite side. In the construction shown in Fig. 1 the swell or bulge is shown as bearing against the inner faces of the two walls of the rake-head A while the straight end portions bear against the inclined flange of the holder B, but of course the lateral might be bent or bulged so as to reverse such bearing on the walls of the chamber. Constructing the lateral of a tooth in this manner makes it of greater effective size for clamping purposes than the body portion 10 of the tooth. It will be understood, of course, that the smaller the diameter of the wire from which a tooth is formed the larger will be the bend or bulge given to the lateral, the amount of such bend or bulge being, in all cases, sufficient to increase the effective size of the lateral, for clamping purposes, to the size of the chamber in which the lateral is to be placed and held.

The distortion of the lateral for the purpose described can be accomplished in other ways than that just described, and in Figs. 4 to 9, inclusive, I have illustrated several modified forms of lateral. In the construction shown in Figs. 4 and 5 the main or body portion of the rake-tooth is indicated by 10ª and the lateral by 11ª. The lateral in this modification is formed with heads or enlargements, which are indicated by 12 and 13 respectively. Such portions 12 and 13 can be produced by crowding the metal from the central portion of the tooth lateral to the ends of the lateral, which would cause the portion between said heads or enlargements to be slightly less than its original diameter. In Figs. 6 and 7 the main or body portion of the tooth is indicated by 10ᵇ and its lateral by 11ᵇ. In the construction there shown the lateral is provided with longitudinal corrugations which can readily be made during the formation of the tooth, and at the same time the material of the lateral will be so operated on by the forming tool or die as to cause the ridges of the corrugations to be forced outwardly to the desired extent. In the third modified form, viz., that shown in Figs. 8 and 9, the main or body portion of the tooth is indicated by 10ᶜ and its lateral by 11ᶜ. In this construction the lateral is made, as best shown in Fig. 9, with two opposite sides flattened which of course can be readily done by a suitable die or tool.

In all three modified forms the extent or amount of expansion or distortion of the metal of the lateral will be, as described in connection with the form of Figs. 1 and 2, proportioned to the diameter of the wire from which the tooth as a whole is formed, so that the lateral will effectively engage the walls of the receiving and holding chamber that is, as stated, of a size adapted to receive and hold a straight undistorted lateral of the largest sized tooth.

By the expression "distorted" as used herein in connection with the lateral, I mean to be understood as covering and embracing all of the constructions shown and described herein, as well as others, whereby the metal of the lateral is so changed in shape as to make it of effective size for clamping purposes in a chamber or socket in which the lateral would not so fit if such lateral were left of the same size, shape or appearance as the main or body portion of the tooth.

What I claim as my invention and desire to secure by Letters Patent is,—

1. The combination with a tooth-holder having a socket of predetermined diameter, of a rake-tooth having an integral lateral forming a bearing, said tooth being of normally a different diameter than the diameter of the socket, and said lateral being of distorted shape to fit in said socket.

2. A wire rake-tooth having an integral lateral forming a bearing, said lateral being of distorted shape whereby it will fit an opening of greater diameter than if such lateral were not distorted.

3. A wire rake-tooth having an integral lateral forming a bearing, said lateral being of distorted shape whereby it is modified so that its effective size for insertion in a chamber or opening differs in size from that of the main body of the tooth.

4. A wire rake-tooth provided with a lateral forming a bearing and having an offset bend to increase its effective diameter, whereby it will fit a chamber or opening of greater diameter than the actual diameter of the lateral.

5. A wire rake-tooth provided with a lateral forming a bearing and having an offset bend to increase its effective diameter, whereby it will fit a chamber or opening of greater diameter than the actual diameter of the lateral, said offset bend being between the end portions of the lateral, and said end portions being in substantial alinement.

6. A wire rake-tooth having a lateral of distorted shape to increase its effective clamping size when inserted in a chamber or opening of greater diameter than the diameter of the body of the tooth, the end portions of the lateral being in substantial alinement.

JAMES MACPHAIL.

Witnesses:
C. H. MELVIN,
W. G. DUFFIELD.